Oct. 10, 1967 T. W. HARRIS 3,345,759

TYPE OF FLASH CARD

Filed Feb. 5, 1965 2 Sheets-Sheet 1

INVENTOR
THADDEUS WILLIAM HARRIS
BY: James E. [signature]
HIS ATTORNEY

Oct. 10, 1967 T. W. HARRIS 3,345,759

TYPE OF FLASH CARD

Filed Feb. 5, 1965 2 Sheets-Sheet 2

INVENTOR
THADDEUS WILLIAM HARRIS
BY: James E. Snead
HIS ATTORNEY

United States Patent Office 3,345,759
Patented Oct. 10, 1967

3,345,759
TYPE OF FLASH CARD
Thaddeus William Harris, 3 W. Geneva Drive, Tempe, Ariz. 85281
Filed Feb. 5, 1965, Ser. No. 430,662
8 Claims. (Cl. 35—31)

This invention relates to an improvement in arithmetic flash cards.

It is an object of this invention to provide an improved arithmetic flash card, or set of flash cards, whereby the various arithmetic procedures are displayed on fewer cards than have heretofore been required in the art for a comparable operation.

It is a further object of this invention to provide a flash card or set of flash cards in an arithmetic field which are easy to operate, simple to understand, and eye-catching for the student.

It is a further object of this invention to provide an arithmetic flash card or set of flash cards which are compact and which present the maximum usable arithmetic operations on each card to obtain the maximum use from a single card.

Referring now to the drawings.

The flash cards 10, used for the instruction of and drilling in arithmetic addition, subtraction, multiplication and division facts, consist of stiff cardboard cut in the shape of right isosceles triangles, measuring seven inches on each leg, forming right angles at the apex 16, and measuring approximately ten inches along the base.

Figure 1:
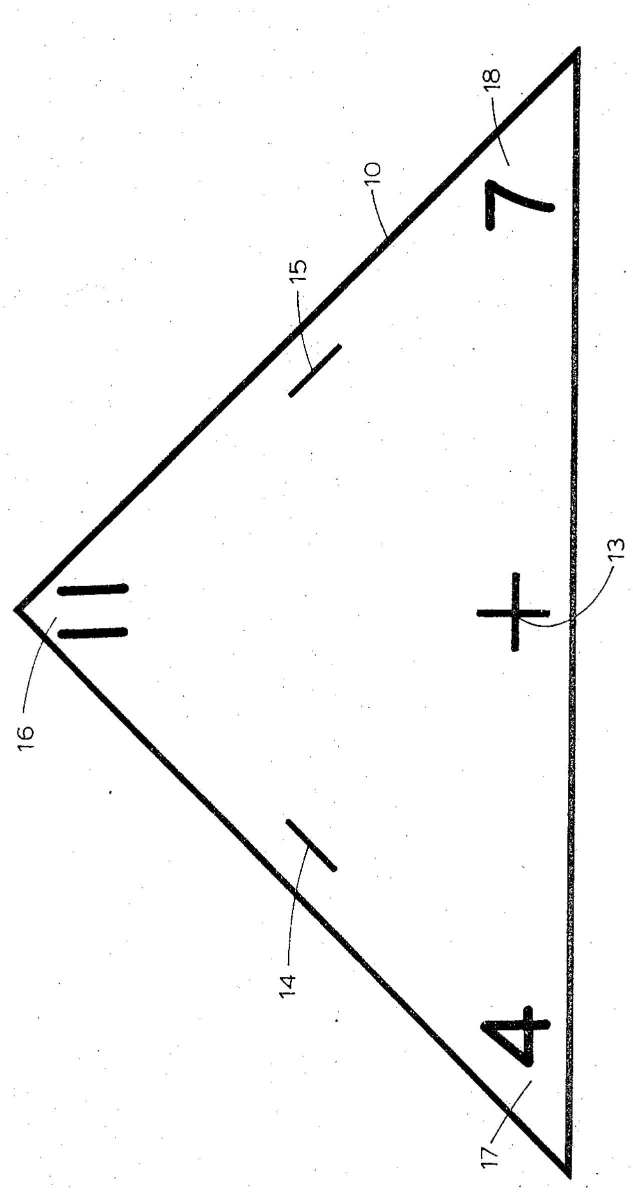
FIG. 1 is one embodiment of my invention showing addition and subtraction operations.
Figure 2:
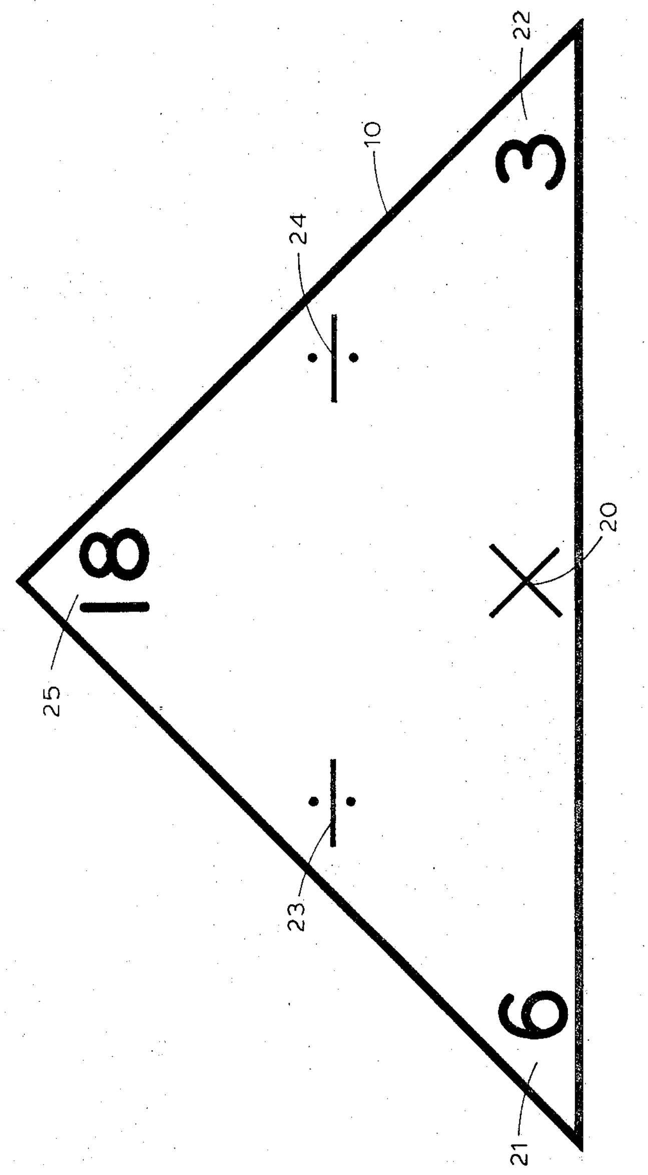
FIG. 2 is one embodiment of my invention showing multiplication and division operations.

On an addition flash card, as shown in FIG. 1, the two numbers 4 and 7 to be added are printed prominently within the base angles 17 and 18 of the triangle, and the sum 11 printed within the right angle at the apex 16. An addition sign 13 separates the two addends, and two subtraction signs 14 and 15 are printed along each leg, parallel to the legs, separating the sum from each addend. The cards are printed on each side, and a total of thirty cards suffices for all additions of any two single digit numbers, from zero through nine.

The cards are to be used by teachers of elementary school children for both instruction and drill. The instructor holds the card in full view of the class, covering with the hand either the sum, located at the right angle apex 16 of the card, to test the addition fact, or covering with the hand one of the two numbers located within the base angles 17 and 18 of the triangle, to test either of the two related subtraction facts.

The same type of card is used to test multiplication and the related division facts except that a multiplication sign 20 separates the two factors located within the base angles 21 and 22 of the triangular card, and two division signs 23 and 24 separate the product at the apex 25 from either factor at the base. The instructor follows the same procedure, covering with the hand that holds the card the answer required. There are sufficient cards, printed on both sides, to test all multiplication facts through the twelve table, with all related division facts.

What is claimed is:

1. An arithmetical teaching aid comprising:

a triangular flash card having three numbers displayed on one of the faces of said card;

each of said numbers being located adjacent to one of the angles of said triangular card;

any two of said numbers being combinable to present an arithmetical problem with the remaining number being the answer thereto;

a mathematical symbol displayed along each of the three legs of the triangular sides of said card, each symbol being located between two of the numbers;

said symbol representing an arithmetical operation to be performed in combining the two adjacent numbers;

whereby any two of the numbers and the symbol therebetween may be displayed to present an arithmetical problem while the remaining number may be obscured until it is desired to display the answer.

2. An arithmetical teaching aid as defined in claim 1 wherein:

said triangular flash card has displayed on the face of said card opposite to that on which the said three numbers and the said symbols are displayed, directions for the use of the card.

3. An arithmetical teaching aid as defined in claim 1 wherein:

said triangular flash card has displayed on the face thereof opposite to that on which the three numbers are displayed a second set of three numbers, each of said second set of numbers being located adjacent to one of the angles of said triangular card;

any two of said second set of numbers being combinable to present an arithmetical problem with the remaining number being the answer thereto;

a symbol displayed on each of the legs of the triangular sides of said card, each symbol being located between two of the numbers;

said symbol representing an arithmetical operation to be performed in combining the two adjacent numbers;

whereby any of the two numbers and the symbol therebetween may be displayed to present an arithmetical problem while the remaining number may be obscured until it is desired to display the answer.

4. An arithmetical teaching aid as defined in claim 2 wherein:

two of the symbols displayed on said card are arithmetical minus signs and one of said symbols is in arithmetical plus sign.

5. An arithmetical teaching aid as defined in claim 2 wherein:

two of said symbols are arithmetic division signs and one of said symbols is an arithmetic multiplication sign.

6. An arithmetical teaching device as defined in claim 3 wherein:

two of the symbols displayed on said card are arithmetical minus signs and one of said symbols is an arithmetical plus sign.

7. An arithmetical teaching device as defined in claim 3 wherein:

two of said symbols are arithmetic division signs and one of said symbols is an arithmetic multiplication sign.

8. An arithmetical teaching aid as defined in claim 1 including:

a plurality of triangular flash cards as defined in claim 1.

References Cited

UNITED STATES PATENTS

| | | | |
|---|---|---|---|
| 1,194,858 | 8/1916 | Matthews | 273—152.1 |
| 2,769,640 | 11/1956 | Elder | 35—31.8 X |
| 3,104,106 | 9/1963 | Kenney et al. | 35—72 X |
| 3,206,872 | 9/1965 | Nason et al. | 35—31.8 |

EUGENE R. CAPOZIO, *Primary Examiner.*

W. GRIEB, *Assistant Examiner.*